[54] ANTENNA SIDE LOBE REJECTION SYSTEM

[75] Inventor: Nean K. Lund, Berkeley Heights, N.J.

[73] Assignee: Bell Telephone Laboratories, Incorporated, New York, N.Y.

[22] Filed: Oct. 31, 1963

[21] Appl. No.: 320,565

[52] U.S. Cl. ............... 328/116; 328/147; 307/235; 343/100 LE
[51] Int. Cl.² .......................................... H03K 5/20
[58] Field of Search.... 343/100 R, 100 CL, 100 LE, 343/119; 325/476; 328/116, 117, 146, 147

[56] References Cited
UNITED STATES PATENTS

| | | | |
|---|---|---|---|
| 2,783,453 | 2/1957 | Rose | 328/146 X |
| 2,934,644 | 4/1960 | Petriw | 328/146 |
| 3,031,142 | 4/1962 | Cohen et al. | 328/117 X |
| 3,292,150 | 12/1966 | Wood | 328/116 X |
| 3,763,490 | 10/1973 | Hadley et al. | 328/100 LE X |

Primary Examiner—T. H. Tubbesing
Attorney, Agent, or Firm—A. E. Hirsch

EXEMPLARY CLAIM

5. In an information processing system having a plurality of input conductors carrying individual signals of which at most two are at any instant principal signals, the others being spurious, the identities of said principal signals changing from instant to instant, and having means for utilizing said principal signals, apparatus for rejecting spurious signals which comprises, means for continuously combining all of said signals to produce an average value signal, means for continuously subtracting the two of said signals of greatest magnitude from said average value signal to produce a reference signal, means for designating a selected multiple of said reference signal as a threshold signal, means for comparing each individual signal with said threshold signal to develop an indication for each signal which exceeds the magnitude of said threshold signal, and means for passing to said utilizing means only those signals indicated as exceeding the magnitude of said threshold signal.

7 Claims, 2 Drawing Figures

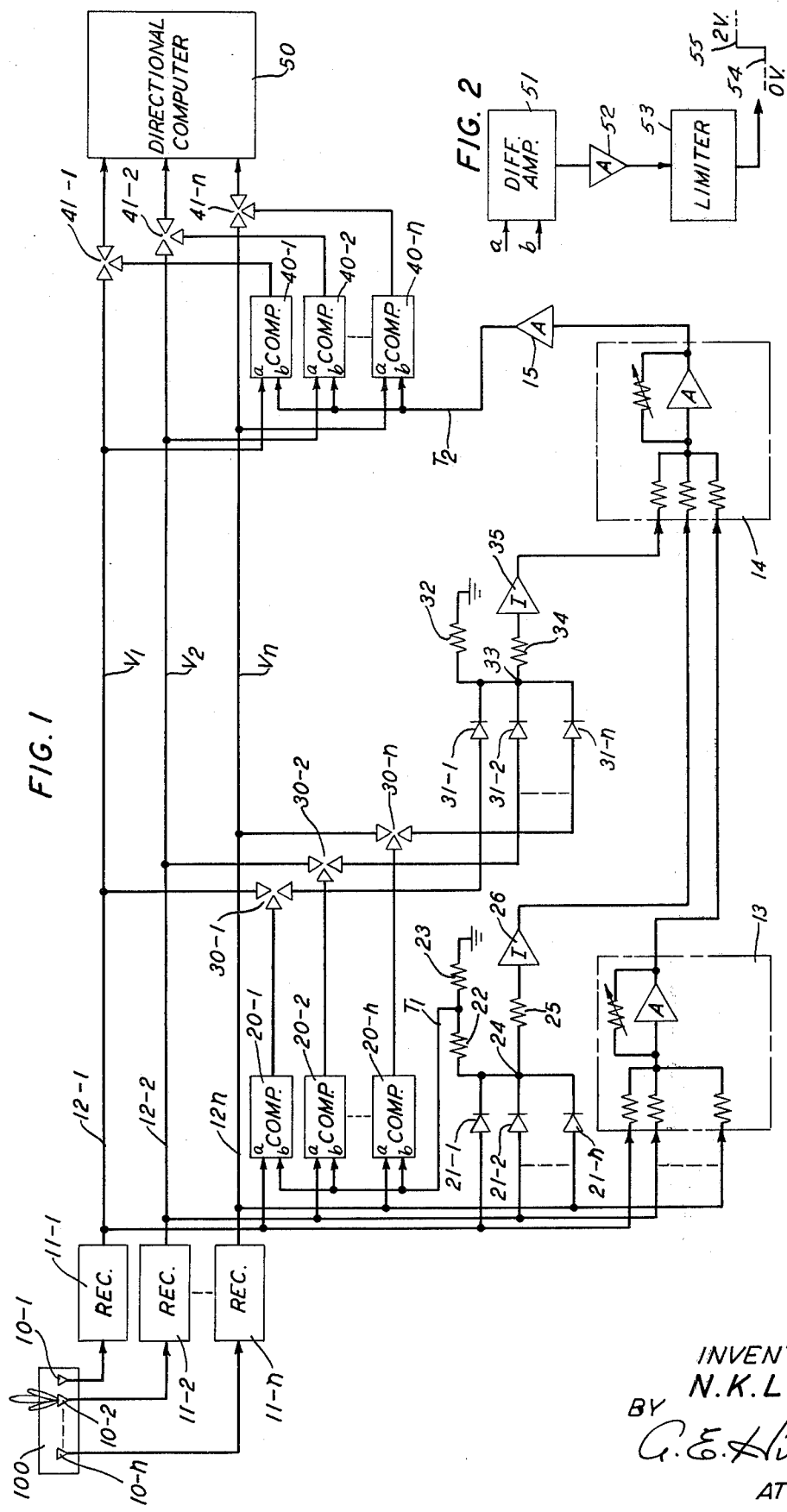

ANTENNA SIDE LOBE REJECTION SYSTEM

This invention deals with the sorting and classification of signals, e.g., incoming pulse echoes in a radar system, with the object of segregating the significant members of a group of such signals from the spurious members and so providing for the acceptance of the former for further processing and the rejection of the latter.

Situations in which such a signal-sorting operation is called for are typified by target acquisition radar systems of the multiple-beam type in which a plurality of receptors are mounted either in a planar array with their axes of greatest sensitivity splayed somewhat apart, or in a steerable planar phased array with many receptors connected to a system of phase shifters. Incoming pulse echoes picked up by the several receptors are converted by receivers into electrical signals, one from each receptor, and from these signals, or a selected subgroup of them, a computer determines the angle of elevation, or azimuth or both, of a target at which the pulse echoes originate.

The sensitivity pattern of each receptor is characterized by a single main lobe coinciding with the receptor axis and, surrounding it in pairs, side lobes of various orders (primary, secondary, etc.) of various magnitudes or strengths and spaced from the main lobe by various angles in dependence on the structure of the receptor. From the standpoint of the computation of target direction, side lobe responses are spurious, and, if not rejected, give rise to erroneous estimates of target direction. Consequently, it is of importance to reject them. But because the amplitude of any received signal by itself carries no information as to whether it represents a main lobe response or a side lobe response, such rejection presents a problem.

If attention could safely be restricted to a target that is located on the main lobe axis of some single receptor, it would be a simple matter, by turning to account the diversity techniques developed in the field of long distance radio communication, to pick the strongest single response, reject all the others and conclude that the target is located on the beam axis of the receptor giving the strongest response. According to one approach to the problem, this is done by arranging that all of the signals of the group, or the strongest ones of them, provide a threshold bias for all receivers, in which case all but the one whose response is the strongest are biased beyond cutoff and only the strongest signal comes through. However, for precise determination of the direction of a target in the case in which the line of sight falls between the axes of two adjacent receptors, it is imperative that the two corresponding main lobe responses only be accepted, even though one is significantly weaker than the other. Further, a threshold based on an average of all signals or an average of the strongest ones, fails to provide sufficient discrimination between weak main lobe responses and strong side lobe responses.

The present invention provides for the acceptance of a single main lobe response, or, in the case of an off-axis target, of two adjacent main lobe responses and, when no target is in the field of view of the receptors, of none at all. It prevents acceptance of three or more responses thus insuring that no signal accepted shall be due to a side lobe response. It attains this result by restricting the threshold between principal lobe responses and side lobe responses to a value based on the side lobe responses alone, so that the probability is greatly increased that main lobe signals only are accepted for processing. The single main lobe signal, or two adjacent main lobe signals, are thus detected and excluded from the preparation of the threshold signal, the threshold being developed by summing or averaging the signals of all remaining receivers of the set and augmenting the derived sum by a selected percentage. When no target is in the field of view, no individual signal is very much stronger than the threshold and hence none exceeds it. When a target comes into the field of view it is either on the axis of some one receptor or between the axes of two adjacent receptors and by virtue of the inherent independence of the threshold on the main lobe signals, the strong main lobe response is accepted or two adjacent main lobe responses of somewhat lesser strength are accepted. Except in most unusual circumstances, rarely encountered, the threshold based only on side lobe responses suffices to reject all side lobe responses while still passing the main lobe responses of two adjacent antennas to a computer for processing.

The invention will be fully apprehended from the following detailed description of an illustrative embodiment thereof taken in conjunction with the appended drawings in which:

FIG. 1 is a block schematic diagram showing apparatus embodying the invention; and FIG. 2 is a block schematic diagram illustrating one form of voltage comparator suitable for use in the apparatus of FIG. 1.

FIG. 1 shows a typical radar system in which a plurality of antenna receptors 10-1, 10-2, ... 10-$n$ are schematically illustrated as forming an antenna array 100. Typically, antenna 100 employs a large number of individual receptors mounted in a planar array, either symmetrical or nonsymmetrical, with their axes of greatest sensitivity splayed somewhat apart so that their main lobe responses overlap slightly. Each receptor is connected to its own receiver 11-1, 11-2, ... 11-$n$, which converts its response to incoming radiation into a voltage which appears on one of the conductors 12-1, 12-2, ... 12-$n$. The voltages on these conductors correspond to either main lobe or side lobe responses. For main lobe responses, each conductor corresponds to a particular range of elevation and azimuth angles of wave arrival. Each conductor is connected to a directional computer 50 through gates 41 so that the computer can identify the angle of arrival.

The individual voltages $V_1, V_2, ... V_n$ appearing on the several conductors 12 are supplied by way of branch leads to the several input points of a summing amplifier 13 which may be, for example, of the type described in Swartzel U.S. Pat. No. 2,401,779. As is well known, the output voltage of such an amplifier is proportional to the sum of its input voltages. Hence, the output voltage of summing amplifier 13 is proportional to the average value of all input responses, the main lobe signals as well as all side lobe signals. Since a threshold derived from a summation of all input responses, i.e., an average of all responses, fails to provide sufficient discrimination between main lobe and side lobe responses, it is in accordance with the present invention to exclude from the threshold reference voltage $T_2$ the signals due to main lobe responses when they occur either singly or in pairs. This is accomplished in the following fashion.

The average value signal produced by amplifier 13 is supplied as one input to a second summing amplifier 14 which may be of the same construction as 13. Summing amplifier 14 is supplied at its input additionally with signals inversely proportional to the magnitudes of the main lobe signals; i.e., signals whose algebraic sign is negative so that during the summing operation they are subtracted from the total. The output voltage developed by amplifier 14, designated threshold $T_2$, is thus an average of side lobe responses only. It is eventually used for preventing all side lobe responses from reaching direction computer 50 or a similar utilization device. In this way the computer will be supplied with main lobe response data only.

To isolate the main lobe signals and prepare them for eventual exclusion from the threshold $T_2$, the individual voltages $V_1, V_2, ... V_n$ appearing on the several conductors 12 are compared in magnitude by comparators 20-1, 20-2, ... 20-n with a common reference or preliminary threshold voltage $T_1$ which is generated in the following fashion. Branch leads from the several incoming conductors 12 are applied to the several input points of diodes 21-1, 21-2, ... 21-n whose outputs are connected together and, by way of a voltage divider composed of resistors 22 and 23 connected in series, to ground. Diodes 21 are arranged to select the largest amplitude signal appearing on any one of the several input leads. This action takes place because the largest signal passed by any one of the diodes develops a potential at point 24, i.e., across resistors 22 and 23, which effectively back biases the remaining diodes thereby to prevent signals on the other input leads from appearing across the resistors. The largest single voltage only appears at point 24. A portion only of the largest signal is supplied as a first, or preliminary, threshold voltage $T_1$, to the enabling input points of all of the comparators 20. Typically, the threshold potential $T_1$ is arranged, by suitable selection of the values of resistors 22 and 23 to be just slightly less than the magnitude of the largest signal that appears at point 24. This may also be accomplished by dispensing with resistor 22, developing a voltage across resistor 23, and passing this voltage through a resistor (not shown) in series with the comparator inputs. The net result is the same.

The exact differential is dependent on the construction of comparators 20. It must be sufficiently smaller than the signal at 24 to prevent indecisive action by the comparator, and yet close enough to the value of the largest selected signal to prevent the comparator supplied with the largest signal from delivering an output control signal; i.e., to remain in the inactive or "zero" state. This differential between the magnitude of the largest signal and the magnitude of threshold $T_1$ is necessarily larger than all other signal responses supplied to the remaining comparators, so that all remaining comparators are actuated to deliver control signals at their outputs; i.e., are placed in the active or "one" state.

Each individual comparator may be of any suitable construction, an illustrative embodiment being shown in FIG. 2. Here, the first apparatus component is a differential amplifier 51 preferably of the polarized variety such that it delivers an output when and only when the magnitude of the signal applied to one of its input points exceeds that applied to the other. The excess is increased in strength by a high gain amplifier 52 and the amplified signal is severely clipped by a limiter 53. Thus, when the level of a signal applied to one input, e.g., $a$, of the differential amplifier is equal to or greater than that applied to the other input, e.g., $b$, the output of limiter 53 has a first value 54, designated for example the "zero" state. If the level of the signal applied to input $a$ is less than the level of the signal applied to input $b$, the limiter output takes on a second value 55 significantly different from the first.

Consider for the moment the case in which response $V_1$ on conductor 12-1 is equal to 10 volts, $V_2$ on conductor 12-2 is equal to 9.5 volts, and $V_n$ on conductor 12-n is equal to 4 volts. In this case, the 10 volt signal only appears at point 24 across voltage divider 22–23 since it is the largest signal. The 10 volt signal effectively back biases diode 21-2, ... 21-n so that it only is available for further processing.

The largest signal voltage, representing very probably a main lobe response, is next excluded from entering into the average upon which the final decision threshold $T_2$ is prepared by passing it by way of scaling resistor 25 to inverting amplifier 26. Amplifiers which invert the polarity of a signal are well known in the art and may take the form of a suitably programmed operational amplifier. The inverted signal produced by it is passed to one input of summing amplifier 14. It is, of course, subtracted in amplifier 14 from the algebraic summation of all signals applied to the amplifier.

The largest signal is also scaled down to a value of approximately 9.9 volts in voltage divider 22–23 and supplied as threshold voltage $T_1$ to the enabling inputs of comparators 20. At comparator 20-1 a 10 volt signal appears at input $a$ as compared with a 9.9 volt reference signal at input $b$. Approximately a 1 percent differential thus exists between the two inputs of the comparator so that it remains inactive or in its zero state. It will be observed that the threshold voltage $T_1$ at the $b$ inputs of all other comparators exceeds the corresponding signals applied to the $a$ inputs so that all of the comparators 20-2, ... 20-n actuated and supply a control signal at their outputs. It is thus apparent that a comparator delivers a control signal at its output when and only when the applied threshold voltage $T_1$ exceeds the magnitude of the signal applied from one of the conductors 12. Advantageously, the outputs of the several comparators, when they exist, are of uniform amplitudes. For example, with comparators of the sort illustrated in FIG. 2, an output of approximately 2 volts is developed when the unit is actuated, and zero volts otherwise.

In accordance with the invention, the two-valued control signals appearing at the outputs of the several comparators are employed to permit the second largest of the input responses to be excluded from the average used to specify threshold $T_2$. Whenever one of the comparators 20 is actuated, the control signal developed by it is applied to the control terminal of a switch 30, sometimes called a gate, to establish a conduction path for the corresponding input signal on conductor 12 to the input of a diode 31. Each of the gates 30-1, 30-2, ... 30-n, shown schematically to illustrate better the principles of the invention, is advantageously instrumented with a high-speed semiconductor electronic component.

Diodes 31, supplied at their inputs with signals passed by those gates 30 that are actuated, have their common outputs connected by way of resistor 32 to ground. Of the several signals simultaneously supplied to the diodes, only the largest appears across the resistor 32, that is, at point 33. As in the case of diodes 21, the largest signal at point 33 effectively back biases the other diodes, leaving only the largest available for further use. Since the largest signal of the entire set was excluded by the action of one of the comparators 20 and one gate 21, the largest signal selected by diode array 31 is in actuality, the second largest of the set. The largest signal is passed by way of scaling resistor 34 and inverting amplifier 35 to one of the input terminals of summing amplifier 14.

Returning to the example of typical voltages outlined above, gate 30-1 only remains inactive, since comparator 20-1 only was supplied with an input signal $V_1$, that was greater than threshold $T_1$. $V_2$ of 9.5 volts, and $V_n$ of 4 volts are thus passed by way of gates 30-2 and 30-$n$ respectively from conductors 12-2 and 12-$n$ to diodes 31. Of these, the largest apparently is $V_2$ which is inverted in amplifier 35 and appears as a —9.5 volt signal at one of the inputs of summing amplifier 14.

It is now apparent that the signal $V_1$, of greatest magnitude representing one main lobe response, and signal $V_2$, of second greatest magnitude representing very probably another main lobe response, appear in inverted form at inputs to summing amplifier 14 together with a signal from summing amplifier 13 which is an average of all responses, including $V_1$ and $V_2$. These two signals are thus effectively subtracted from the algebraic combination of all input signals supplied by summing amplifier 14 leaving a threshold voltage $T_2$ composed exclusively of minor lobe antenna responses; the two largest signals are not included in it. For the above example, $T_2$ may well be 9.5 volts providing an appreciably greater threshold differential than would be obtained with a simple average, or an average of largest signals.

Preferably, the signal developed by summing amplifier 14 is increased by a slight increment, either by suitable control of the gain element of amplifier 14 itself, or by means of an auxiliary amplifier 15, to insure that the magnitude of threshold signal $T_2$ exceeds slightly the average magnitude of all side lobe signals. Threshold signal $T_2$, as thus prepared, is applied to the enabling input of comparators 40-1, 40-2, ... 40-$n$. Comparators 40 are supplied at their other inputs individually by way of branch circuits with the signals appearing on conductors 12. The differential established for comparators 40 is such that an output signal is produced only if the signal input is significantly greater than the threshold. Necessarily, the two main lobe signals are the only ones that will exceed the threshold. The two main lobe signals only are thereupon passed by way of the appropriate switches, or gates, 41 to computer 50. In this way, the identity of the signals supplied to the computer is assured. All side lobe signals which entered into the generation of threshold $T_2$ are significantly lower than the threshold requirement so that none of them is passed to the computer. The control signals developed by the comparators 40 for those input signals which exceed the threshold, are supplied respectively to the control terminals of gates 41-1, 41-2, ... 41-$n$. When a comparator is actuated, its output thus establishes a conductive path for signals supplied on conductors 12 via gates 41 to direction computer 50. Comparator 40 may be of the form shown in FIG. 2 and gates 41 may be in all respects identical to gates 30.

In the example given above, responses $V_1$ and $V_2$ only exceed threshold $T_2$; consequently $V_1$ and $V_2$ only are passed as analog signals to computer 50. The computer may be of any desired construction. Since it forms no part of the present invention, it will not be further described. Suffice it to say that if it is arranged to operate on digital signals, as opposed to analog signals, it may contain an analog-to-digital converter. Alternatively, for a digital input, the control signals developed by comparators 40, being already in the digital form, may be supplied directly to computer 50. In this eventuality, gates 41 need not, of course, be used.

Although the invention has been found to be most advantageous in a system using a relatively small number of receptors in the antenna array, it is equally valuable in larger arrays since even in large arrays it is the two largest signals that most influence the threshold determination. Eliminating the two largest signals measurably aids in discriminating between main lobe and side lobe signals. The typical improvement for a large receptor system has been found to be somewhat greater than 3 db. When receiving only side lobes, the two largest side lobes are, of course, removed from the sum used to form the threshold. While this tends to make the sum less and reduce the margin for gating out of side lobes, there is, nevertheless, an appreciable net advantage over the long term because elimination of the main lobe responses, from the average, when there are main lobes, has a greater effect than eliminating the two largest side lobes in the absence of main lobes.

It should be noted that the principles of the invention may be extended to include any number of individual diode selection circuits, dependent only on the number of receiver beams overlapping. Further, one diode selecting bus only may be used if desired, and some fixed multiple of the largest voltage may be subtracted out, thus to compensate for the lack of additional diode buses, and yet to assure a gating threshold that more nearly approaches the desired value.

What is claimed is:

1. An information processing system comprising a plurality of input conductors carrying individual signals of which at most two are at any instant principal signals, means for utilizing said principal signals, means in circuit relation with said input conductors for continuously selecting from all of said signals the one with the largest amplitude, means in circuit relation with said input conductors and with said selecting means for continuously additively combining the remaining ones of all of said signals to develop a reference threshold slightly in excess of the majority of said remaining signals, means for comparing each individual signal with said reference threshold, and means responsive to said comparing means for passing to said utilizing means only those signals whose magnitude exceeds said threshold.

2. An information processing system comprising a plurality of input conductors carrying individual signals of which at most two are at any instant principal signals, means for utilizing said principal signals, means in circuit relation with said input conductors for continuously selecting from all of said signals the two with the largest amplitudes, means in circuit relation with said input conductors and with said selecting means for continuously additively combining the remaining ones of all of said signals to develop a reference threshold slightly in excess of the majority of said remaining signals, means for comparing each individual signal with said reference threshold, and means responsive to said comparing means for passing to said utilizing means only those signals whose magnitude exceeds said threshold.

3. An information processing system comprising a plurality of inputs supplying individual signals of which, at most, two are at any instant principal signals, means for utilizing said principal signals, means supplied with signals from said inputs for continuosuly additively combining said signals to develop an average value signal, means supplied with signals from said inputs for continuously selecting from all of said signals the two with the greatest magnitudes, means for continuously subtracting said two signals with the greatest magnitudes from said average value signal to produce a reference signal, means for augmenting the magnitude of said reference signal by a selected percentage thereof to produce a threshold signal, means for comparing the magnitude of each of said signals from said inputs with the magnitude of said threshold signal, and means responsive to said comparing means for passing to said utilization means only those signals whose magnitude exceeds said threshold.

4. In an information processing system having a plurality of input conductors carrying individual signals of which at least two are at any instant principal signals, the others being spurious, the identities of said principal signals changing from instant to instant, and having means for utilizing said principal signals, apparatus for rejecting spurious signals which comprises, means for continuously selecting from all of said signals a selected number of those with the largest amplitudes, means for continuously additively combining the remaining ones of all of said signals to develop a reference threshold slightly in excess of the majority of said remaining signals, means for comparing each individual signal with said reference threshold to develop an indication for each signal which exceeds said threshold, and means for passing to said utilizing means only those signals indicated as exceeding said threshold.

5. In an information processing system having a plurality of input conductors carrying individual signals of which at most two are at any instant principal signals, the others being spurious, the identities of said principal signals changing from instant to instant, and having means for utilizing said principal signals, apparatus for rejecting spurious signals which comprises, means for continuously combining all of said signals to produce an average value signal, means for continuously subtracting the two of said signals of greatest magnitude from said average value signal to produce a reference signal, means for designating a selected multiple of said reference signal as a threshold signal, means for comparing each individual signal with said threshold signal to develop an indication for each signal which exceeds the magnitude of said threshold signal, and means for passing to said utilizing means only those signals indicated as exceeding the magnitude of said threshold signal.

6. An information processing system comprising a plurality of input conductors carrying individual signals of which the two with the greatest magnitudes at any instant are principal signals and the others are spurious signals, the identities of said principal signals changing from instant to instant, means for utilizing said principal signals, means for continuously additively combining all of said individual signals to develop an average value signal, means for continuously identifying the two of said signals with the greatest magnitudes, means for continuously subtractively combining said greatest magnitude signals with said average value signal to develop a reference signal, means for developing from said reference signal a threshold signal proportionate to the average magnitudes of all of said signals exclusive of said greatest magnitude signals, means for continuously comparing the magnitudes of each of said individual signals with said threshold, and means for passing to said utilization means as principal signals only those signals whose magnitudes exceed said threshold.

7. In combination, a plurality of inputs supplying individual signals of which the magnitudes of at least two at any instant exceed the magnitudes of the remaining ones of said signals, first means for continuously additively combining all of said individual signals to develop a signal proportionate to the average value thereof, means for continuously selecting from among said individual signals the one with the greatest magnitude, means for continuously selecting from among said individual signals the one with the second greatest magnitude, means for continuously subtractively combining said signals selected as having the greatest and second greatest magnitudes with said average value signal to develop a threshold signal proportionate to the average value of all of said individual signals except said greatest and second greatest signals, means responsive to said threshold signal for identifying those of said individual signals whose magnitudes exceed the magnitude of said threshold signal, and means for statistically processing said identified signals.

* * * * *